(12) United States Patent
Adams et al.

(10) Patent No.: US 6,169,831 B1
(45) Date of Patent: *Jan. 2, 2001

(54) METHOD OF MAKING OPTICAL CHIRPED GRATING WITH AN INTRINSICALLY CHIRPED GRATING AND EXTERNAL GRADIENT

(75) Inventors: Laura Ellen Adams, Basking Ridge; Benjamin John Eggleton, Berkeley Heights; Rolando Patricio Espindola, Chatham; Sungho Jin, Millington; Hareesh Mavoori, Berkeley Heights; John A. Rogers, New Providence; Thomas Andrew Strasser, Warren, all of NJ (US)

(73) Assignee: Lucent Technologies Inc., Murray Hill, NJ (US)

( * ) Notice: Under 35 U.S.C. 154(b), the term of this patent shall be extended for 0 days.

This patent is subject to a terminal disclaimer.

(21) Appl. No.: 09/237,123

(22) Filed: Jan. 26, 1999

Related U.S. Application Data

(63) Continuation-in-part of application No. 09/159,178, filed on Sep. 23, 1998.

(51) Int. Cl.$^7$ ....................................... G02B 6/34
(52) U.S. Cl. ................................................. 385/37
(58) Field of Search ................................. 385/15, 24, 37, 385/123, 124, 130

(56) References Cited

U.S. PATENT DOCUMENTS

| | | | | |
|---|---|---|---|---|
| 5,982,963 | * | 11/1999 | Feng et al. | 385/37 |
| 5,999,546 | * | 12/1999 | Espindola et al. | 372/20 |
| 5,999,671 | * | 12/1999 | Jin et al. | 385/37 |
| 6,031,950 | * | 2/2000 | Fujita | 385/37 |
| 6,055,348 | * | 4/2000 | Jin et al. | 385/37 |

* cited by examiner

*Primary Examiner*—John D. Lee
*Assistant Examiner*—Michelle R. Connelly-Cushua
(74) *Attorney, Agent, or Firm*—Mathews, Collins, Sheperd & Gould, P.A.

(57) ABSTRACT

A method for making a chirped grating device capable of a broad bandwith for optical communication systems is disclosed. An intrinsically-chirped optical grating is externally strained to alter the range of chirping. The external strain may be induced by a gradient-generating body bonded onto the length of the fiber grating that may be latchably strained so that the grating characteristics may be changed or tuned while avoiding use of a continuous power supply. Various optical networking applications using such dispersion compensating devices are also disclosed.

20 Claims, 6 Drawing Sheets

METHOD OF MAKING OPTICAL CHIRPED GRATING WITH AN INTRINSICALLY CHIRPED GRATING AND EXTERNAL GRADIENT

RELATED APPLICATIONS

This case is a continuation-in-part of U.S. application Ser. No. 09/159,178, filed Sep. 23, 1998.

FIELD OF THE INVENTION

This invention relates to an optical fiber grating device and more particularly, a chirped grating.

BACKGROUND OF THE INVENTION

Optical fibers and fiber gratings are useful for telecommunication transmission and networking. Basically, optical fibers are thin strands of glass capable of transmitting information-containing optical signals over long distances with low loss. In essence, an optical fiber is a small diameter waveguide comprising a core having a first index of refraction surrounded by a cladding having a second (lower) index of refraction. As long as the refractive index of the core exceeds that of the cladding, a light beam propagated along the core exhibits total internal reflection, and it is guided along the length of the core. Typical optical fibers are made of high purity silica, and various concentrations of dopants may be added to control the index of refraction.

Optical gratings are important elements for selectively controlling the paths or properties of traveling light and specific wavelengths of light transmitted within optical communication systems. Gratings based on optical fibers are of particular interest as components in modem telecommunication systems. For example, in long-distance transmission of optical signals, the accumulation of signal dispersion may be a serious problem. This problem intensifies with an increase in the distance the signals travel and the number of channels in a wavelength-division-multiplexed (WDM) optical communication system. Optical fiber grating devices may be used to compensate for chromatic dispersion.

Optical gratings may include Bragg gratings, long-period gratings, and diffraction gratings. These gratings typically comprise a body of material with a plurality of spaced-apart optical grating elements disposed in the material. Often, the grating elements are non-chirped gratings in that they comprise substantially equally-spaced index perturbations, slits, or grooves. However, chirped gratings, comprising unequally-spaced perturbations, are used as well. Chirped gratings may be linearly-chirped (having perturbations that vary in a linear fashion), or non-linearly or randomly chirped.

An extrinsic chirp refers to a chirp in the grating that is obtained by applying an external perturbation-generating field (an "external gradient") to the fiber. In the past non-chirped fibers have been subjected to external gradients to produce chirped fibers. To create a chirp, an external gradient has been applied non-uniformly along the length of a non-chirped fiber, resulting in non-uniform changes in properties of the fiber grating, thus creating a chirp. An extrinsic chirp is valuable in that it may be applied to adjust the parameters of the grating, and it may be used to control the dispersion of a fiber Bragg grating. External gradients are well-known and typically comprise strain gradients or temperature gradients. Use of a temperature gradient to impose a chirp on a fiber grating is described, for example, in U.S. Pat. No. 5,671,307 to Lauzon, issued Sep. 23, 1997, which is incorporated herein by reference. Similarly, it was proposed that a chirp could be induced in a grating using a strain gradient in P. C. Hill & B. J. Eggleton, ELECT. LETT. Vol. 30, 1172–74 (1994), incorporated herein by reference.

There are disadvantages, however, in forming chirped gratings with an external gradient. The maximum chirp rate (or range of chirping) that can be achieved is limited in that relatively large gradients (or forces) are required to obtain a range of chirping, but such forces may have a negative impact on the reliability of the fiber. For example, a temperature gradient may be applied along the length of the fiber to create a chirp in the fiber grating, and the chirp rate can be controlled by adjusting the temperature difference between the ends of the grating. The maximum chirp rate that can be imposed on the grating is limited, however, by the material properties of the fiber. The maximum temperature at which the gratings in typical fibers are thermally stable is on the order of about 200° to 500° C. At these temperatures, the grating strength can decay. See T. Erdogan, V. Mizrahi, P. J. Lemaire, and D. Monroe, J. APPL. PHYS. Vol. 76, No. 1 (1994), at pp. 73–80. Also, moderate temperatures should be used to ensure that the grating devices remain thermally stable over long periods of time. These limitations restrict the range of chirp that may be obtained with a temperature gradient.

In the past, extrinsic chirp nevertheless has been used to obtain chirped gratings, using unchirped gratings. This is because unchirped gratings have been much easier to fabricate than intrinsically-chirped gratings. An intrinsically-chirped grating (or "intrinsic chirp") refers to a grating in which the chirp has been incorporated into the fiber during the fabrication process. For example, an intrinsic chirp may be achieved by using a prescribed phase mask in which the period of the phase mask varies in some manner. When radiation is applied to the fiber through the phase mask, the resulting fiber will be inherently chirped. Using this technique, one may obtain broadband gratings that can compensate for dispersion slope in a multiple channel system. However, the intrinsic chirp prescribes a fixed amount of dispersion and a specified reflection spectrum. While such gratings may be valuable in communication systems where a specific amount of dispersion compensation is required, the dispersion and amplitude response of the grating is essentially fixed, and thus, the intrinsically-chirped gratings are not well suited to situations in which dynamically adjustable devices are required.

Those concerned with technologies involving optical communications systems continue to search for new grating designs such as broadband gratings that are well suited for dynamically adjustable devices. This invention discloses a method for making such a grating device and optical communication systems comprising such a device.

SUMMARY OF THE INVENTION

Summarily described, the invention embraces a method for making a chirped fiber grating device comprising providing a length of waveguide having an intrinsically-chirped grating region and applying an external gradient or force to the waveguide to alter the range of the chirping. The intrinsically chirped grating region may be linearly or non-linearly chirped. The external gradient is not confined to a particular type of external perturbation and may comprise a temperature gradient, a strain gradient, or other external perturbation, including, for example, a gradient induced by magnetic or mechanical forces. The grating device optionally may comprise a tunable dispersion compensator device comprising a length of waveguide having a chirped grating region, a body attached to the waveguide proximal the grating region, and a component for inducing elastic strain in the body. In one embodiment, the component for inducing elastic strain may comprise magnets disposed alongside the fiber. Many embodiments and applications for the device are contemplated, including dispersion compensator modules, amplifiers, and WDM systems.

BRIEF DESCRIPTION OF THE DRAWINGS

The advantages, nature and additional features of the invention will appear more fully upon considering the illustrative embodiments described in the accompanying drawings. In the drawings.

It is to be understood that these drawings are for purposes of illustrating the concepts of the invention and except for the graphs are not to scale.

DETAILED DESCRIPTION OF THE INVENTION

Figure 1A:
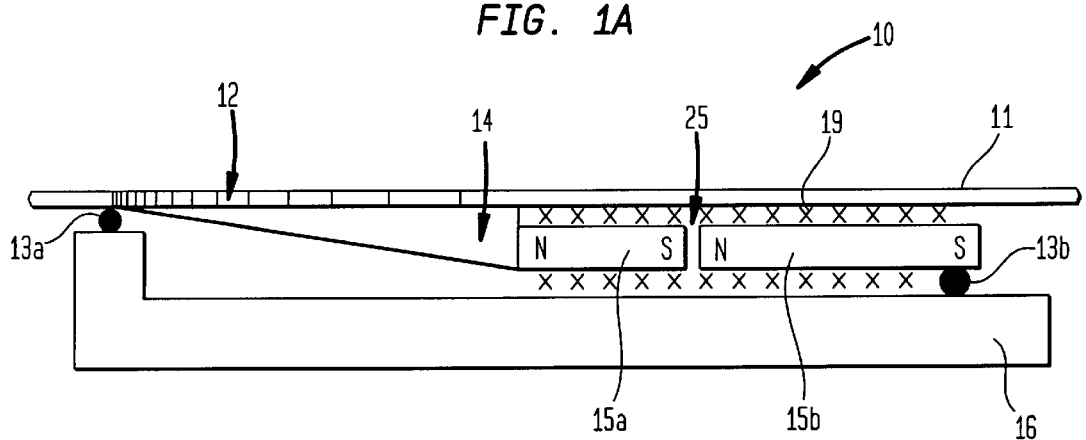
FIGS. 1A–1C schematically illustrate exemplary embodiments of the grating device comprising a dispersion compensator and an external force imposed by a gradient-generating body.
Figure 1B:
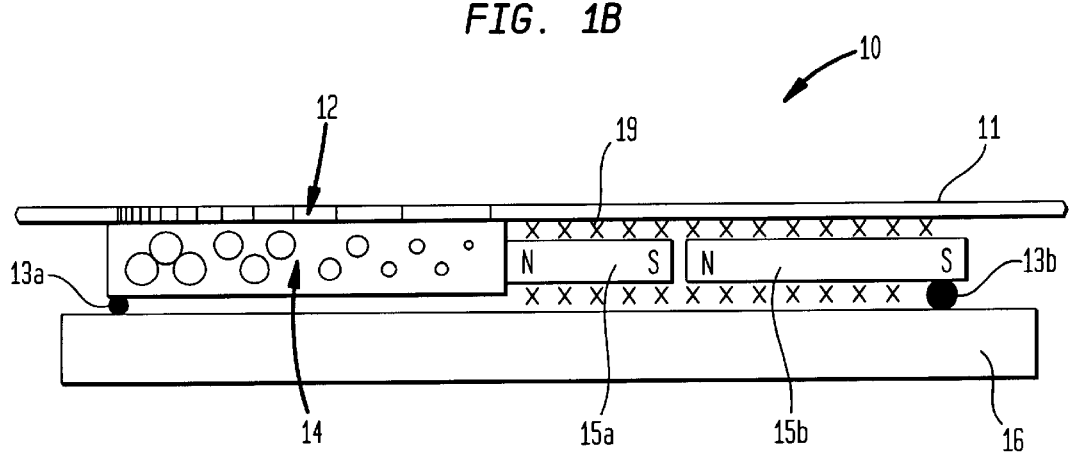
Figure 1C:
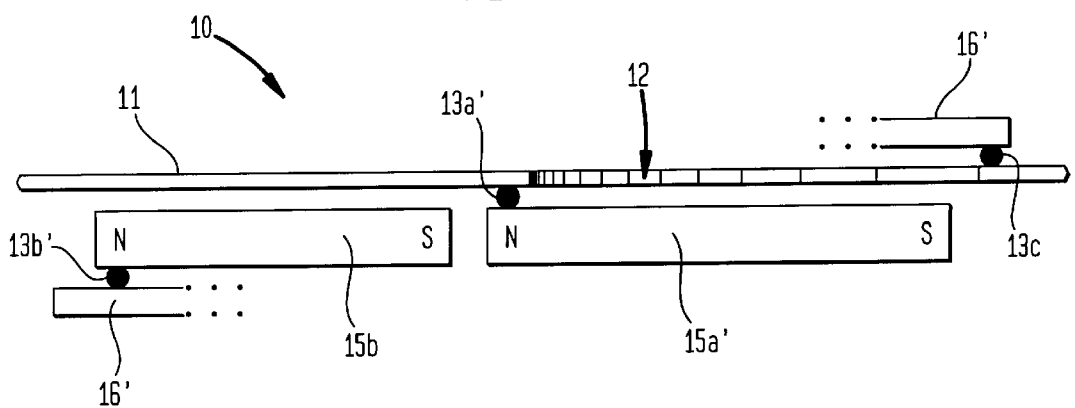

Referring to the drawings, FIGS. 1A–1C illustrate exemplary embodiments of the inventive grating device 10 which may comprise a dispersion compensator. The grating is fabricated by providing a length of waveguide, such as an optical fiber 11, having a grating region 12 in the waveguide. The grating region 12 is shown in FIGS. 1A–1C as having unequally-spaced perturbations, reflecting an intrinsically-chirped grating. An external gradient or force is applied to the waveguide to alter the range of the chirp. The invention is not limited to a particular type of external gradient or method for producing it; the gradient may comprise a temperature gradient, a strain gradient (e.g., mechanically or magnetically-induced), or any other gradient capable of imposing an external perturbation on the fiber. In the embodiment shown in FIGS. 1A–1C, a magnetically-induced strain is applied. In FIGS. 1A–1B, a body 14 is shown attached to the waveguide at the grating region 12, and one or more components (e.g., 15a, 15b) are provided for inducing strain in the body 14. As noted, other types of external forces or gradients may be used, such as mechanically-induced force (described further below), or a temperature gradient, as are known. In the embodiment of FIGS. 1A–1C, first and second magnetic components 15a, 15b, are attracted to or repelled from each other to induce elastic strain to the fiber at the grating region, with a separate body 14 being attached to the fiber in FIGS. 1A and 1B.

With this invention, a device capable of having a range of gratings and broad bandwith may be formed while using lower temperatures and reduced forces as compared with previous methods, and the dispersion and amplitude response of the grating may be adjusted. A chirped bandwith of up to 8 nm or more may be achieved. Such a broad bandwidth would be useful for many applications, whereas a grating prepared according to previous methods would not be operable. For example, a WDM lightwave system may be designed to operate on 10 channels simultaneously, spaced apart by 100 GHz (0.8 nm). A grating device would be invaluable for this system to compensate for fluctuations in the optimal dispersion map of the optical network and dispersion slope. However, the total bandwidth of a grating for such an application would need to be at least 8 nm or more. With previous methods involving application of an external gradient to a non-chirped fiber, one could not effectively obtain a stable fiber grating having this bandwidth. To avoid thermal effects, grating devices should be operated at less than 200° C. This temperature gradient corresponds to a Bragg wavelength shift (at 1.5 $\mu$m) of only 2 nm, and thus, the temperature gradient would not be sufficient to obtain the chirped bandwidth of 8 nm. A strain gradient is also limited by the maximum applied strain which, in typical fibers, may be about 5 nm. However, if an intrinsically chirped grating is provided having a total bandwidth of about, for example, 6 nm, a temperature of less than 200° C. could be applied to increase the bandwidth by 2 nm up to the 8 nm bandwith required for this application. Similarly, a tolerable strain gradient (e.g., below about 5 nm), could be applied to an intrinsically chirped grating to achieve the 8 nm bandwidth. The combination of extrinsic and intrinsic chirp thus produces a grating device that is operable in a tunable manner on up to 10 channels and yet does not suffer from reliability issues or breakage.

In FIGS. 1A–1B, the fiber 11 is shown bonded along the length of the grating region 12 to and along the length of the body which is a gradient-generating body 14. Due to a gradient in the body 14, when the body is subjected to a uniform strain, such as a tensile or compressive strain, the body in turn induces a non-uniform strain on the fiber to cause a non-uniform change in the grating periodicity and alter the chirping. The gradient in the body may be a dimensional gradient, e.g., due to a geometric gradient in the diameter, thickness, or width of the body as shown in FIG. 1A, or a porosity gradient, e.g., due to perforations varying in some degree (e.g., in a gradient manner by size, extent, or distribution), along the length of the body, as illustrated in FIG. 1B. Alternatively, the gradient may be what is referred to herein as a chemistry gradient, meaning a gradient in atomic mix ratio of elements comprising the body, which in turn creates a property gradient, such as an elastic modulus of the body. It should be understood that more than one body may be used.

When a gradient-generating body is used as in FIGS. 1A–1B, a non-uniform strain is induced in the fiber grating which alters the range of chirping in an originally chirped grating. The pre-chirped grating may be linearly, non-linearly, or any-pattern chirped. The non-uniform strain provided by the extrinsic force increases the slope of the chirping gradient along the length of the grating. It should be understood that although FIGS. 1A–1C show a single grating region, multiple-in-series gratings may be used and simultaneously subjected to the external gradient.

Referring to FIGS. 1A–1B which involve gradient straining, the first magnet 15a (also referred to herein as the mobile magnet), may be attached to-the gradient-generating body 14. This attachment may be formed with use of epoxy, solder, brazing, welding, glass adhesives, mechanical clamping, mechanical hooks, or other attachment methods or devices as are known. At least a second magnet 15b (also referred to herein as the immobile magnet), is placed with one of its poles proximal that of the first magnet 15a. It should be understood that more than one mobile or immobile magnet also may be used in combination. The immobile magnet 15b is bonded or attached to a supporting fixture 16 which can optionally also serve as a guiding tube for movement of the body 14, which is illustrated in FIG. 1A. The gradient-generating body 14 preferably also is bonded onto a supporting fixture which may be the same supporting fixture 16 holding the immobile magnet 15b. For example, in FIGS. 1A–1B, the fixture 16 is shown secured to the body 14 at one end (e.g., the left end), at attachment point 13a, and it is shown secured to the immobile magnet at the other end (e.g., the right end), at attachment point 13b. The fixture 16 may be made in various shapes and sizes, and the L-shaped member of FIG. 1A or the tube or channel configuration of FIG. 1B are merely exemplary. The fixture may guide the movement of the mobile magnet and protect the assembly or simply be a block of solid material.

At least one solenoid 19 with conductive wire windings may be disposed adjacent or preferably, around the first or second magnet or both so that a magnetic field can be generated when a current is passed into it. The solenoid may be a single solenoid, or it may be split into two or more segments, and if desired, independent controls may be used for enhancing control over the magnetic field generated. The magnetic moments induced in the magnets create an attractive (or repulsive) force between their mating poles which causes a tensile (or compressive) strain in the gradient-generating body 14 and attached fiber grating 12.

Exemplary advantageous materials for fabricating the gradient-generating body 14 include glass, ceramic, metal, or composite materials. For example, the fiber grating itself is typically fabricated with silica glass, and the same material may be used to fabricate the body 14, which then may be bonded onto one side of or around the grating. Alternatively, using silica glass, the gradient-generating body may be integrally formed with the optical fiber, for example, the fiber can be shaped so that is has a variable diameter to form a geometric gradient, and the grating structure can be written into the fiber at the region of this geometric gradient either before or after the fiber is fabricated. Metals and alloys also advantageously may be used to form the gradient-generating body, as they may be easily fabricated into gradient structures of variable widths or thicknesses and then bonded onto the fiber at the grating region with adhesives, such as glass adhesives (e.g., low melting point glass), epoxy, or by solder bonding. Another advantageous approach for forming the gradient-generating structure involves depositing onto the surface of the fiber at the grating region metallic or ceramic coatings having a desired thickness or property gradient. Various physical or chemical processing methods may be used to deposit the materials, including sputtering, evaporation, chemical vapor deposition, electrodeposition, electroless deposition, and dip-coating, or substractive methods may be used such as etching, gradient5 porous etching of deposited material, and the like.

In FIG. 1C, a gradient-generating body is not attached to the fiber, but instead, two magnetic components 15a' and 15b impose strain in the grating. In this embodiment, one magnetic component 15a' is mobile and attached directly to the fiber adjacent the grating region at bond region 13a' for inducing strain in the fiber. An immobile magnet 15b is attached to a fixed substrate 16' or guiding rail at bond region 13b'. The fiber 11 may at a separate point of attachment 13c also be secured to the guiding rail 16.' Here, the body 15a' induces a shift in wavelength distribution which can be useful for some applications.

The device may be fabricated using the inventive method so that the strain is latchable or non-latchable. Where a non-latchable strain is desired, advantageously soft-magnetic materials may be used to fabricate the magnetic components, and the dispersion-compensating characteristics of the inventive device may be frequently and temporarily (e.g., for a short duration) changed. If the magnetic field is increased by increasing the electrical current in the solenoid, the strain in the grating may increase, or at least a certain peak level of strain is reached.

Figure 2A:
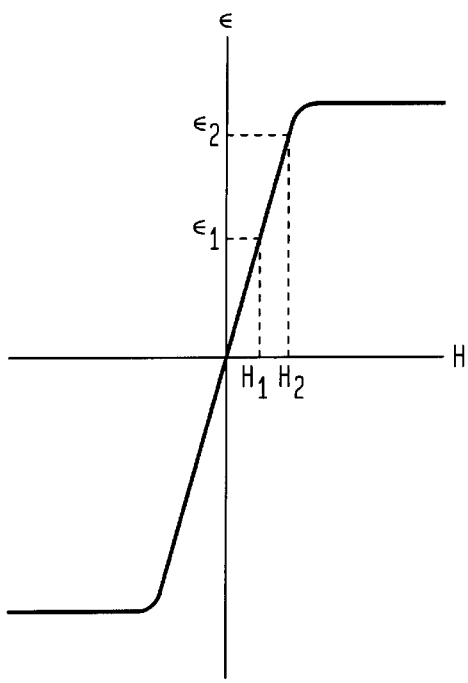
FIGS. 2A–2B are graphs illustrating the effects of non-latchable (FIG. 2A) and latchable (FIG. 2B) strain induced by magnetic field actuation in an inventive grating device comprising a dispersion compensator.
Figure 2B:
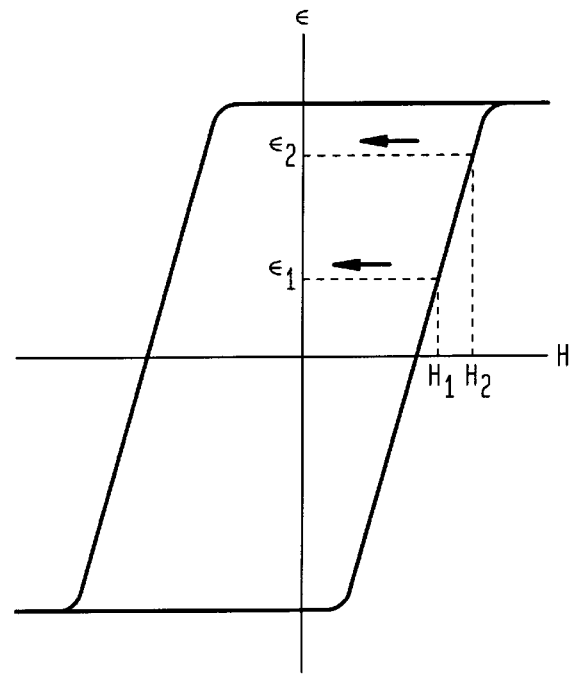

When the applied field in the solenoid is reduced or removed, the strain in the grating also may be reduced or removed. FIG. 2A, for example, illustrates the use of non-latchable strain for applied magnetic fields $H_1$ and $H_2$ and the corresponding induced strains on the grating, $e_1$ and $e_2$.

Where latchable strain is desired, at least one or both of the magnetic components 15a, 15b, may be made of programmable semi-hard magnetic material with an intermediate coercivity ($H_c$) to provide a relatively square magnetic-hysteresis loop, illustrated in FIG. 2B. Where only one magnetic component is made with programmable magnetic material, the other component may be made with magnetically soft material, for example, with low coercivity ($H_c$) of less than about 20 Oe. Such materials include Ni—Fe permalloy or Si-steel. Alternatively, the other (non-programmable) component may be made with a magnetically hard material having a high coercivity $H_c$ of more than about 500 Oe, such as Nd—Fe—B, Sm—Co, or Ba-ferrite materials. Preferred magnetic materials for fabricating a latchable dispersion compensator device are those whose magnetic properties are modifiable by a pulse magnetic field. Suitable materials include Fe—Cr—Co, Fe—Al—Ni—Co (Alnico), Cu—Ni—Fe (Cunife), Co—Fe—V (Vicalloy), specially-processed, low-coercivity ($H_c$) rare-earth cobalt Sm—Co or Nd—Fe—B, and Ba-ferrite or Sr-ferrite materials. A preferred range of coercivity for a programmable magnet is below about 500 Oe and more preferably below about 100 Oe for ease of programming by re-magnetization using a solenoid pulse field. The coercivity typically is above about 10 Oe and preferably above 30 Oe for maintaining the stability of the remanent magnetization and stability against demagnetization due to stray magnetic fields. A non-programmable magnet may be used as a mobile magnet, for example, in combination with a stationary programmable magnet.

To maximize the magnetic force, the gap 25 (FIG. 1A), between the facing magnets 15a, 15b, should be small, since the magnetic force decreases as the size of the gap increases. Preferably, the gap is less than about 80 mil and more preferably less than about 20 mil, and even more preferably less than about 10 mil. For satisfactory latching when the field is removed, the programmable magnet should have a square magnetization-hysteresis loop ("M-H loop") with a squareness ratio (remanent magnetization to saturation magnetization) of at least about 0.85, preferably at least 0.90, even more preferably at least 0.95. For ease of control, the loop is desirably skewed by at least about 50% of $H_c$. Intentional skewing of an M-H loop is described, for example, in U.S. patent application Ser. No. 09/020,206, filed Feb. 6, 1998 by Espindola el al., assigned to the present assignee and incorporated herein by reference. Mechanically ductile and easily malleable or machinable magnet alloys such as Fe—Cr—Co, Cu—Ni—Fe, or Co—Fe—V are particularly advantageous for they may be shaped into desired geometries, such as the rod-like or tube-like geometries shown in FIGS. 1A–1C. Stable permanent magnets with high coercive forces (e.g., where the coercivity is greater than about 1000 Oe), such as Sm—Co or Nd—Fe—B, are less preferred (unless modified to exhibit lower coercive forces) due to difficulties in reprogramming remanent magnetization.

An Fe—28% Cr—7% Co alloy may be deformation-aged to yield a square M-H loop with $H_c$ of 70 Oe, a dimension of about 0.180" in diameter and 4" in length. Where the M-H loop is skewed by about ~60 Oe, a M-H loop similar to that shown in FIG. 2B is produced. For applied magnetic fields of $H_1$ and $H_2$, the corresponding magnetization is latchably retained after the field is removed, and the corresponding separation between the two magnets and the induced strains on the dispersion compensating grating, $e_1$ and $e_2$, are also latchably retained. With the latching, the device may be operated without a continuous supply of power. To vary the degree of tuning, the strain induced in the grating by the gradient-generating body may be altered and latched by changing the magnetization in the programmable magnets. This can be achieved by either increasing the applied field or by demagnetizing and remagnetizing one or more of the magnets to a new field level. For magnetization of the magnets using a solenoid, a pulse field (a pulse current in the solenoid) can conveniently be used for high-speed, low-power operation of the device. A preferred duration or speed of the pulse field is in the range of about 10 to $10^{-6}$ seconds, and more preferably about $10^{-1}$ to $10^{-4}$ seconds. The current pulse may have various shapes including sinusoidal, rectangular, trapezoidal, triangular, and irregular.

Figure 3:
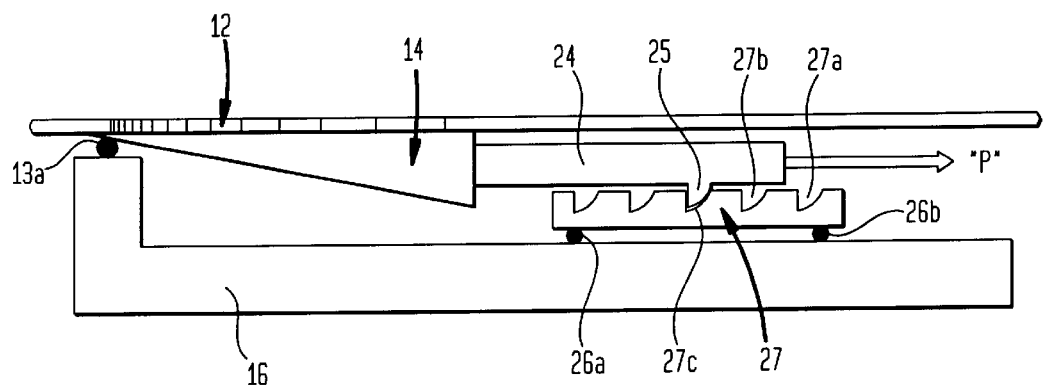
FIG. 3 is an alternative embodiment of the inventive grating device in which extrinsic force is imposed by applying mechanically-induced strain.

FIG. 3 illustrates an alternative approach for performing the inventive method wherein the extrinsic force is a mechanically-induced force. Of course, it should be understood that the use of mechanically-induced force, or the magnetically-induced force previously described, are illustrative, and that other external gradients may be applied to alter the range of chirping, such as a temperature gradient. In the embodiment of FIG. 3, an extension arm 24 is attached to the gradient-generating body 14. The arm 24 in turn is coupled to a source for applying a mechanical force (not shown), for pulling the arm 24 and attached body.14 following arrow "P". The mechanical pull may be provided by various sources including a motor-driven mechanism, spring-driven mechanism, solenoid-core driven mechanism analogous to an LVDT (linear variable differential transformer), and an electrically-actuated magnetic force mechanism. Pneumatic or hydraulic forces and devices for supplying same also may be used. The mechanical force may be made latchable which is advantageous for avoiding a continuous power supply. In FIG. 3, the latching is formed by the underside of the arm having a locking tooth 25 which operates in conjunction with a stepped latching bar 27 which is fixedly secured, e.g., at bond regions 26a, 26b, to the substrate 16. The bar has a plurality of notches 27a, 27b, 27c, disposed therein corresponding substantially in dimension to the locking tooth 25 so that as the arm is mechanically pulled to produce the desired amount of strain, the tooth will become lodged in a notch (e.g., shown at 27c), to hold the arm and gradient-generating body 14 in place. Other devices also are contemplated for latching the mechanical force and component, such as a spring-lock mechanism, ratchet, rotating gear, or the like, as are known.

Figure 4A:
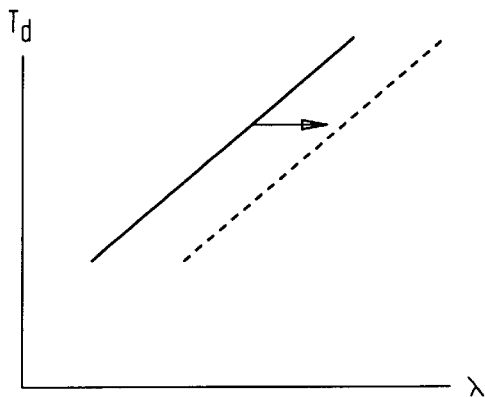
FIGS. 4A–4D are graphs illustrating types of dispersion tuning that may be achieved with the inventive dispersion compensator.
Figure 4B:
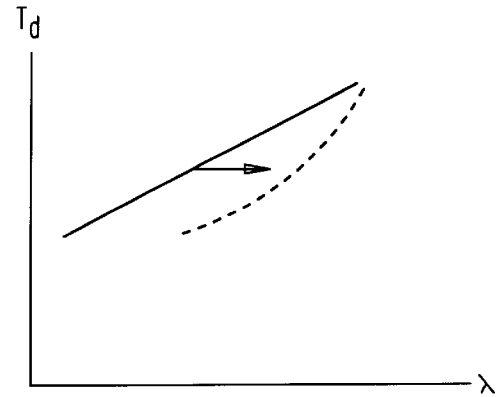
Figure 4C:
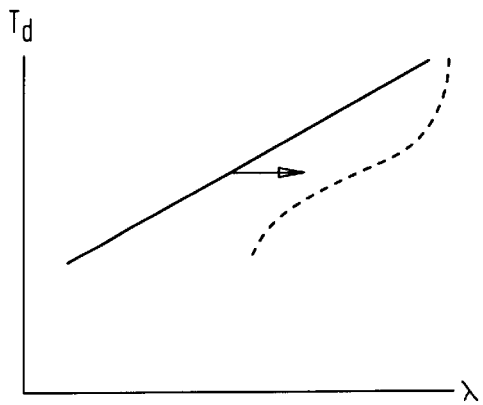
Figure 4D:
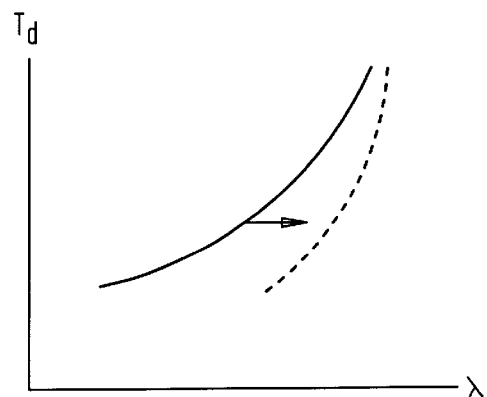

FIGS. 4A–4D are plots of the time delay characteristics $T_d$ (which is a measure of wavelength dispersion) as a function of wavelength λ for different grating devices that have been fabricated according to the invention. These plots illustrate various capabilities of the inventive device in terms of altering chromatic dispersion characteristics. The slope, $T_d$ (time delay)/λ (wavelength), may be adjusted by changing the applied actuation field and hence the latchable movement of the mobile magnet (e.g., 15a, FIGS. 1A–1B). FIG. 4A shows the translational shift of the $T_d$-λ curve where strain has been induced in a uniformly (linearly) chirped grating. FIGS. 4B and 4C illustrate the effects of an embodiment where a linearly chirped dispersion compensating grating is used and strained to exhibit the characteristics of a nonlinear chirped grating. FIG. 4D reflects use of a non-linearly chirped grating which has been made more nonlinear. There are particular advantages as to each of these embodiments depending on the types and the extent of dispersion to be compensated, as should be apparent to one skilled in the field.

Figure 5:
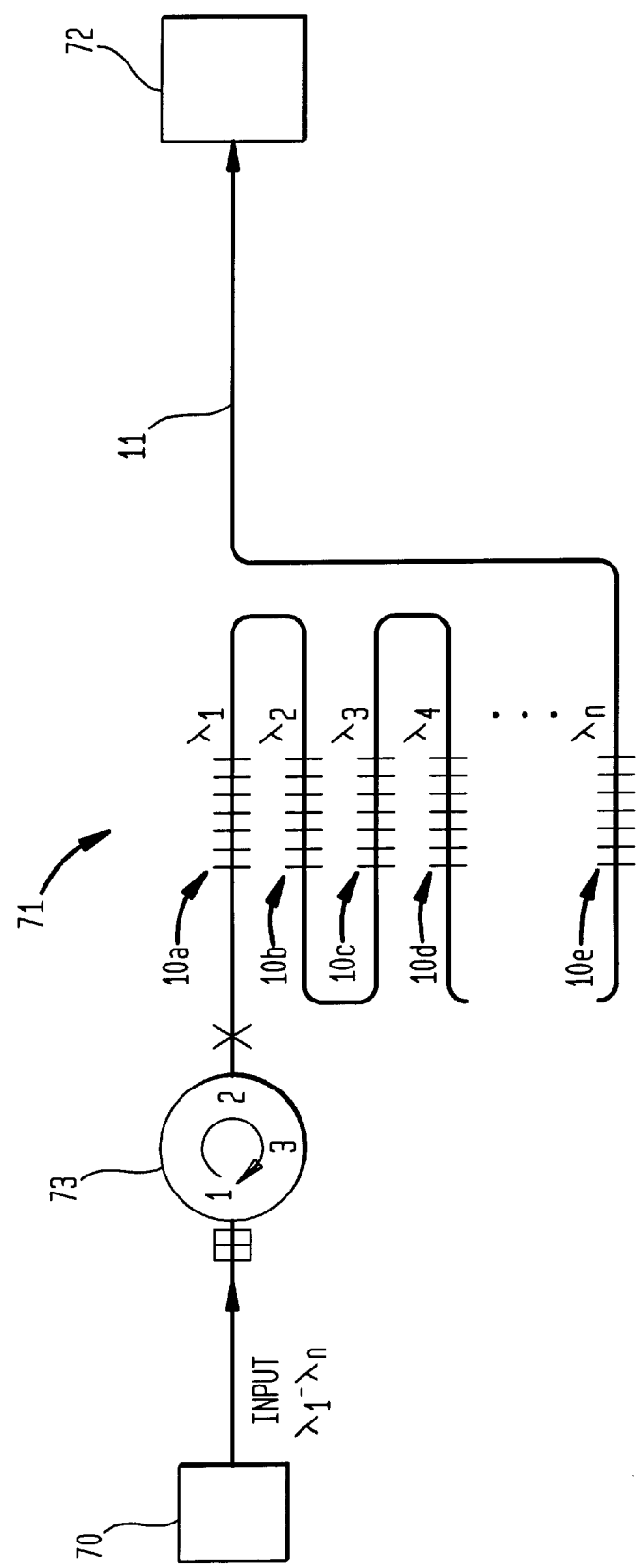
FIG. 5 schematically illustrates an n-channel WDM communication system including an inventive grating device used in a dispersion-compensator assembly.

In FIG. 5, an example of a wavelength division multiplexed (WDM) communications system is schematically illustrated comprising a transmitter 70, an improved N-channel multiplexer/demultiplexer 71, and a receiver 72, all connected by trunk fiber 11. The input to the fiber 11 from the source 70 consists of optical signals at several wavelengths, $\lambda_1$ to $\lambda_n$. The improved multiplexer 71 comprises at least one circulator 73 and a series of independently tunable fiber gratings (10a, 10b, 10c, 10d, 10e), each of which comprise dispersion compensator devices and may be linearly-chirped or non-linearly chirped. Since the inventive device is capable of having a broad bandwidth, each dispersion compensator can compensate for a few to several channels, and the total number of the tunable dispersion compensators used in the system can be substantially reduced as compared with previous systems.

Figure 6:
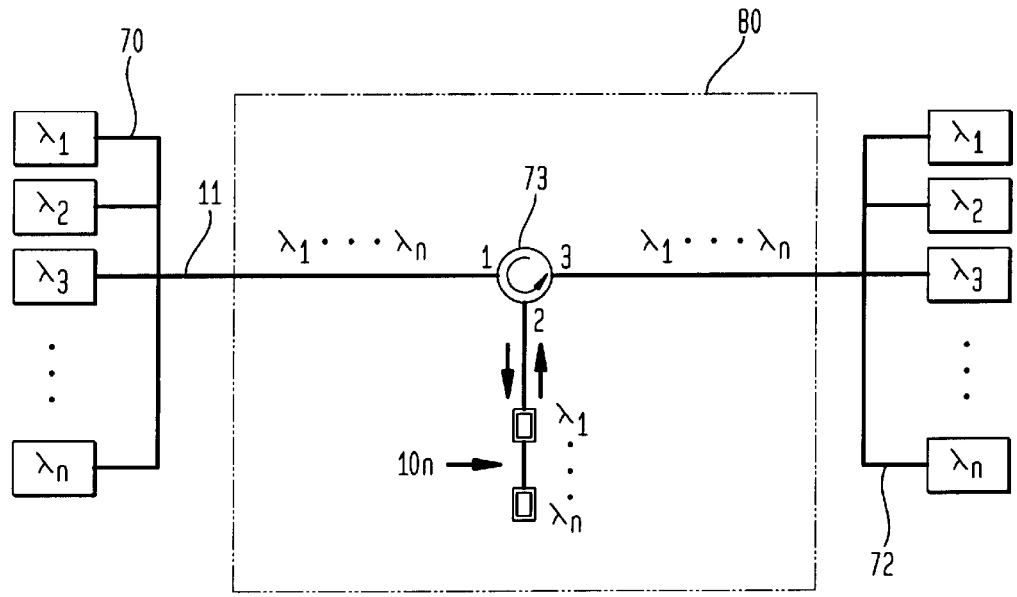
FIGS. 6–9 schematically illustrate optical communication systems comprising the inventive grating device.
Figure 7:
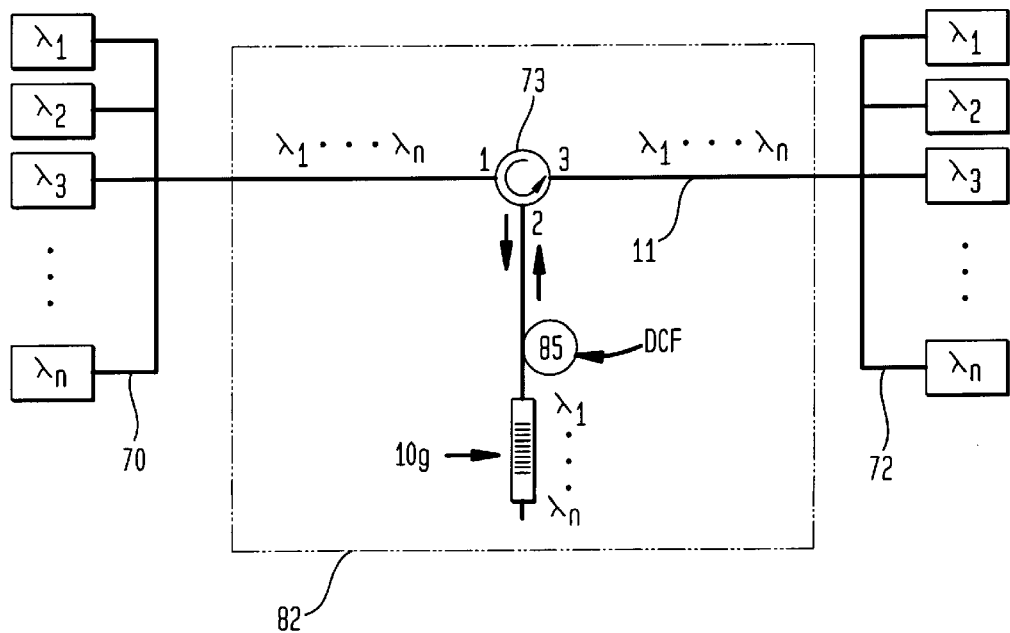

FIGS. 6–9 schematically illustrate optical communication systems comprising inventive tunable grating devices. In FIG. 7, a dispersion compensating module (DCM) at boxed region 80 comprises an optical circulator and a total of "n" number of independently tunable gratings 10n comprising dispersion-compensators. The order in which the gratings may be placed in the module depends on the chromatic dispersion that has accumulated in the system before reaching the DCM. For example, if the accumulated dispersion ($A_D$) for channel λ at $\lambda_1$ is greater than that of channel n at $\lambda_n$ ($\lambda_{D\lambda1} > \lambda_{D\lambda n}$), then the gratings are arranged in the order shown, i.e., the first compensating grating of the DCM is at $\lambda_1$ and the last is at $\lambda_n$. If the accumulated dispersion for channel λ at $\lambda_1$ is less than that of channel n at $\lambda_n$ ($A_D\lambda_1 < A_D\lambda_n$), then the gratings are arranged in the reverse order shown, i.e., the first compensating grating of the DCM is at $\lambda_n$ and the last is at $\lambda_1$. This DCM may comprise part of a dense WDM system (DWDM), further comprising a multi-wavelength transmitter 70, a length of optical fiber 11, and a multi-wavelength receiver 72.

Alternatively to the embodiment of FIG. 6, the DCM may comprise a single tunable chirped fiber grating, as previously described, in place of the "n" number of independently tunable gratings 10n. In this case, the direction of the chirped gratings will depend on the accumulated chromatic dispersion, i.e., if at channel λ $A_D\lambda_1 > A_D\lambda_n$, then the chirped fiber grating is disposed such that at the point of entry, the grating is at $\lambda_1$, but if at channel λ $A_D\lambda_1 < A_D\lambda_n$, the chirped fiber grating is disposed such that at the point of entry, the grating is at $\lambda_n$.

FIG. 7 schematically illustrates a system where a DCM 82 comprises an optical circulator 73, a length of dispersion compensating fiber (DCF) 85, and a single tunable dispersion compensating chirped fiber grating 10g. Alternatively to the single chirped grating device 10g, a plurality of n-number of independently tunable gratings may be used (e.g., the n-number of gratings 10n of FIG. 6 may be substituted for the single chirped grating 10g of FIG. 7). In this case, the majority of the gratings comprising chromatic dispersion compensators is performed by the DCF 85. The remanent chromatic dispersion in each channel, due to a dispersion slope mismatch between the ideal compensator and the DCF, is compensated using the compensating chirped grating 10g (or the n-number of independently tunable gratings 10n). The same principles described above with reference to FIG. 6 relating to the direction of the chirped dispersion grating 10g or the order of the n-number of gratings 10n apply with regard to the embodiment of FIG. 7.

Also as in FIG. 6, this DCM 82 may comprise part of a DWDM further comprising a multiwavelength transmitter 70, a length of optical fiber 11, and a multi-wavelength receiver 72.

Figure 8:
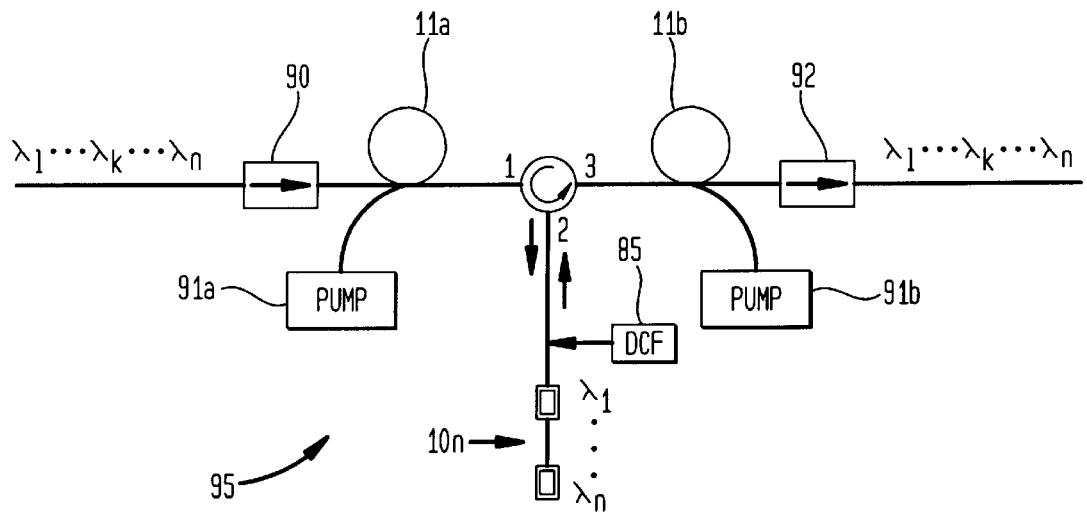
Figure 9:
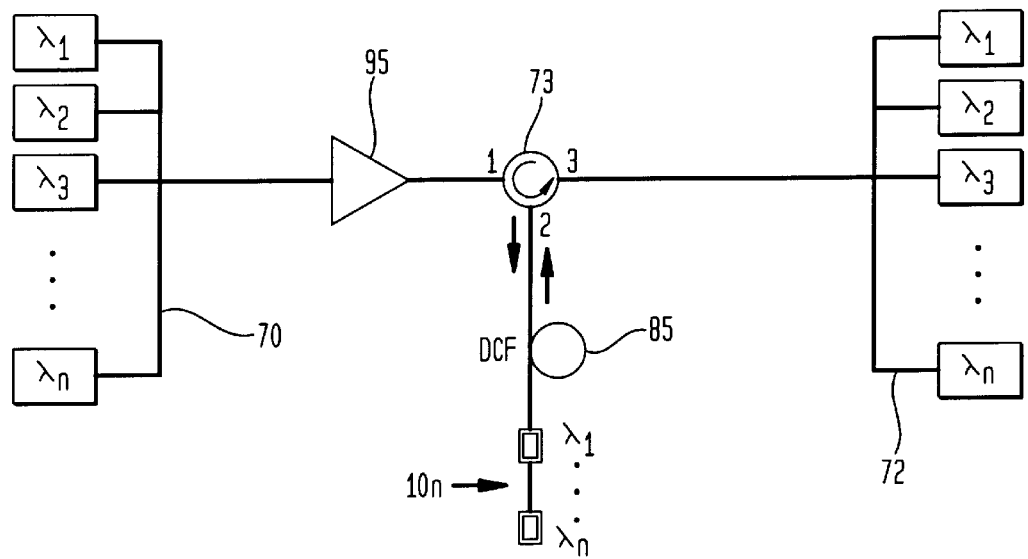

FIG. 8 schematically shows an amplifier 95 having a dispersion compensating module. The amplifier comprises an input isolator 90, a first length of rare-earth doped fiber 11a, a first pump 91a for optical pumping the first length of fiber 11a, a second length of rare-earth doped fiber 11b, a second pump 91b for optical pumping the second length of fiber 11b, an output isolator 92, a circulator 73, and "n" number of independently tunable gratings 10n comprising dispersion-compensators. The optical amplifier not only compensates for chromatic dispersion, but it also amplifies the signals to offset losses introduced by the tunable compensator. Optionally, a dispersion compensating fiber 85 may be used in this amplifier assembly, similarly to FIG. 7. FIG. 9 schematically illustrates a DWDM comprising a multi-wavelength transmitter 70, a length of optical fiber 11, an amplifier 95 which may comprise the amplifier of FIG. 9 containing the DCM, a DCM, and a multi-wavelength receiver 72, where the DCM comprises an optical circulator 73, an optional length of dispersion compensating fiber (DCF) 85, and a series of tunable fiber gratings Ion.

It is to be understood that the above mentioned embodiments are illustrative of only a few of many embodiments which can represent applications of the invention. Numerous and varied other arrangements can be made by those skilled in the art without departing from the spirit and scope of the invention.

We claim:

1. A method for making a chirped grating device having a broad bandwidth and adjustable dispersion and amplitude response, the method comprising the steps of:

providing a length of waveguide having an intrinsically-chirped grating region and applying an extrinsic gradient to the waveguide to alter the range of chirping in the intrinsically-chirped grating region, thereby producing the grating device having the broad bandwidth and adjustable dispersion and amplitude response.

2. The method of claim 1, in which the extrinsic gradient comprises a temperature gradient or a strain gradient.

3. The method of claim 1, in which the extrinsic gradient is applied by disposing a body adjacent the length of waveguide and attached to the waveguide proximal the intrinsically-chirped grating region, and inducing an elastic strain in the body to thereby adjust the range of chirping in the grating.

4. The method of claim 3, in which the body comprises a gradient-generating body having a certain length that is attached along at least a portion of its length to the waveguide at the intrinsically-chirped grating region.

5. The method of claim 4, in which the length of waveguide comprises a length of optical fiber and the gradient-generating body is integrally formed with the fiber.

6. The method of claim 5, in which the gradient-generating body is integrally formed by processing methods selected from sputtering, evaporation, chemical vapor deposition, electrodeposition, electroless deposition, dip-coating, and etching.

7. The method of claim 5, in which the body comprises a mobile magnet secured to the waveguide and the elastic strain is provided by a non-mobile magnet secured to a fixed substrate or guiding rail adjacent the waveguide.

8. The method of claim 1 in which the intrinsically-chirped grating region comprises a long-period grating.

9. The method of claim 1, in which the broad bandwith comprises a bandwith of about at least 8 nm.

10. A dispersion compensating module comprising an optical circulator and a plurality of chirped grating devices prepared according to claim 1. wherein the plurality of chirped grating devices are independently tunable.

11. A wavelength division multiplexed optical communications system comprising a source of multiple wavelength optical signal channels, an optical fiber trunk, a receiver for receiving multiple optical signal channels, a multiplexer/demultiplexer, and one or more gratings prepared according to claim 1.

12. The system of claim 11 further comprising a length of dispersion compensating fiber.

13. An optical amplifier comprising an input isolator, a first length of rare-earth doped fiber, a first pump for optical pumping the first length of fiber, a second length of rare-earth doped fiber, a second pump for optical pumping the second length of fiber, an output isolator, a circulator, and a plurality of gratings prepared according to claim 1.

14. An article comprising a chirped grating device having a broad bandwidth and adjustable dispersion and amplitude response, the device comprising a length of waveguide having an intrinsically chirped grating region and an apparatus for applying an extrinsic gradient to the waveguide to alter the range of chirping in the grating region.

15. The article of claim 14, in which the apparatus is configured to impose an extrinsic temperature gradient on the intrinsically-chirped grating region.

16. The article of claim 10, in which the apparatus comprises a body disposed adjacent the length of waveguide and attached to the waveguide proximal the grating region, and a component for inducing an elastic strain in the body to thereby adjust the range of chirping.

17. The article of claim 16, in which the elastic strain is latchable so that the dispersion compensating characteristics of the waveguide may be controllably altered without a continuous supply of power.

18. The article of claim 14, in which the apparatus imposes a mechanically-induced strain at the grating region.

19. A dispersion compensating module comprising at least one grating device according to claim 14 operating as a tunable dispersion compensating grating.

20. A dispersion compensating module comprising an optical circulator and at least one grating device according to claim 14.

* * * * *